3,210,383
DERIVATIVES OF 1,4-DIAMINO 2-PARA-HY-
DROXYPHENOXY ANTHRAQUINONE
John E. Ferrari, Scarsdale, and Boris Gutoff, Bronx
County, N.Y., assignors to Interchemical Corporation,
New York, N.Y., a corporation of Ohio
No Drawing. Filed Sept. 12, 1962, Ser. No. 223,268
3 Claims. (Cl. 260—380)

This invention relates to anthraquinone dyes that dye synthetic fibers in blue and violet shades, particularly fibers of cellulose acetate or of a polyester made from ethylene glycol and terephthalic acid.

These new dyes have the formula

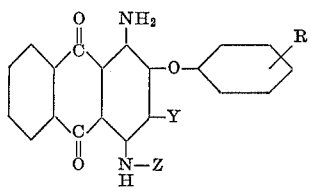

where R is a member of the group consisting of hydroxy, hydroxyalkyl, and alkoxy groups, Y is H or a halogen and Z is H or the p-hydroxyethyl phenyl group.

The dyes may be prepared by condensing a compound having the formula

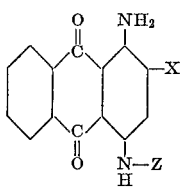

Z having the meaning given above and X indicating a halogen, with the alkali metal salt of a phenol having the formula

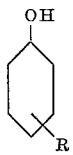

where R has the meaning given above.

The resulting dyestuffs have excellent affinity for cellulose acetate as well as Dacron and other synthetic fibers. The dyes also display a remarkable resistance to sublimation, that is their color is not transferable to white backgrounds or to other fabrics of a different color when the dyed fabric is heated as in laundering or ironing.

The following examples will illustrate the practice of this invention.

*Example 1*

A mixture of 10 g. of hydroquinone, 0.89 g. of potassium carbonate and 2.8 g. of 1-amino-2-bromo-4-(p-hydroxyethyl phenyl) amino anthraquinone (prepared in accordance with the procedure set forth in U.S. Patent No. 2,487,045) is heated to and maintained at 170°–185° C. for 3¾ hours. 200 ml. of water is then added and the mixture is boiled for ½ hour after which the mixture is filtered leaving a sticky mass. A sufficient amount of boiling toluene is added to dissolve the sticky mass. The solution is then cooled and a sufficient amount of petroleum ether is added to precipitate the dissolved material out of the toluene. The precipitate is then added to 100 ml. of boiling acetic acid. The mixture is then filtered and the residue is added to 300 ml. of water and filtered. A blue dyestuff is obtained. It has the following formula

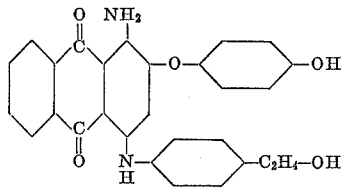

The dye, when dispersed in the conventional manner, has good affinity for and dyes cellulose acetate fibers a royal blue shade of good resistance to light and gas fading. Good dyeings are also obtained on Dacron. The dye does not sublime.

*Example 2*

14 g. of 1,4-diamino-2,3-dichloro anthraquinone is added to a melt of 3.4 g. of potassium carbonate and 100 g. of hydroquinone at 190° C. The mixture is maintained at 185–200° C. for 2 hours. It is allowed to cool and 200 g. of water are added. The temperature is raised to the reflux point. The mixture is filtered while hot and washed with water, filtered, washed with 300 ml. of acetone and again filtered. The residue is dried overnight at 60° C. This dye has the following formula

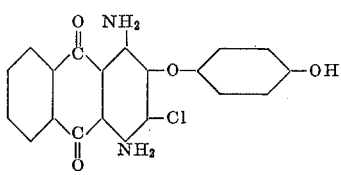

The dye when dispersed in the conventional manner has good affinity for cellulose acetate fibers dyeing them a violet shade having good resistance to light and gas fading. Good dyeings were also obtained on Dacron. The dye does not sublime.

Dacron is a fiber composed of a polyester made from ethylene glycol and terephthalic acid.

While there have been described what are at present considered to be the preferred embodiments of this invention, it will be obvious to one skilled in the art that various changes and modifications may be made therein without departing from the invention, and it is, therefore, aimed to cover all such changes and modifications as fall within the true spirit and scope of this invention.

What is claimed is
1. A new dye having the structural formula

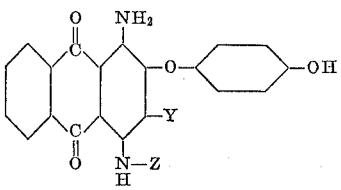

wherein Y is a member selected from the group consisting of hydrogen and chlorine and Z is a member selected from the group consisting of hydrogen and the p-hydroxyethyl phenyl group.

2. A new dye having the structural formula

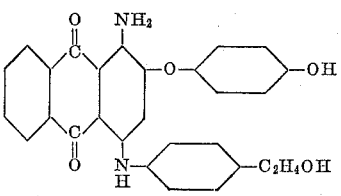

3. A new dye having the structural formula
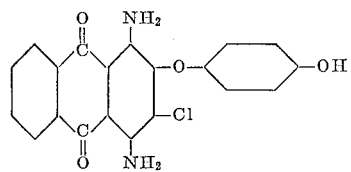
References Cited by the Examiner
UNITED STATES PATENTS
| | | | |
|---|---|---|---|
| 2,487,045 | 11/49 | Dickey et al. | 260—380 |
| 2,773,071 | 12/56 | Pizzarello et al. | 260—380 |
| 2,895,967 | 7/59 | Straley et al. | 260—380 XR |
LORRAINE A. WEINBERGER, *Primary Examiner.*
LEON ZITVER, *Examiner.*